United States Patent
Barrett

(10) Patent No.: US 9,877,292 B2
(45) Date of Patent: Jan. 23, 2018

(54) COLLABORATIVE DATA CAPTURING APPARATUSES AND METHODS

(71) Applicant: QUALCOMM Incorporated, San Diego, CA (US)

(72) Inventor: Michael Gerard Barrett, Cardiff-by-the-Sea, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 14/548,737

(22) Filed: Nov. 20, 2014

(65) Prior Publication Data

US 2016/0150491 A1   May 26, 2016

(51) Int. Cl.
| | |
|---|---|
| *H04W 56/00* | (2009.01) |
| *H04W 24/04* | (2009.01) |
| *H04W 4/00* | (2009.01) |
| *H04W 84/04* | (2009.01) |
| *H04L 29/08* | (2006.01) |

(52) U.S. Cl.
CPC ........... *H04W 56/001* (2013.01); *H04L 67/12* (2013.01); *H04L 67/125* (2013.01); *H04W 4/006* (2013.01); *H04W 24/04* (2013.01); *H04W 84/042* (2013.01)

(58) Field of Classification Search
CPC ... H04W 56/001; H04W 24/04; H04W 4/006; H04W 84/042; H04L 67/125; H04L 67/12
See application file for complete search history.

(56) References Cited

U.S. PATENT DOCUMENTS

| 8,362,923 B2 | 1/2013 | Witte et al. |
| 2007/0150565 A1 | 6/2007 | Ayyagari et al. |
| 2010/0182444 A1* | 7/2010 | Kroepfl ............... H04N 5/2351 348/222.1 |
| 2010/0243970 A1* | 9/2010 | Toshimitsu ........... G02B 5/223 252/582 |
| 2011/0050878 A1* | 3/2011 | Wells ..................... H04N 7/181 348/86 |
| 2013/0128052 A1* | 5/2013 | Catrein .................. H04N 5/232 348/159 |
| 2013/0170417 A1 | 7/2013 | Thomas et al. |
| 2013/0198292 A1 | 8/2013 | Aaltonen et al. |
| 2013/0210563 A1* | 8/2013 | Hollinger ............. H04N 5/2252 473/570 |
| 2013/0251332 A1* | 9/2013 | Giacomelli ........... H04N 7/188 386/228 |
| 2013/0329016 A1 | 12/2013 | Hwang et al. |
| 2014/0226648 A1 | 8/2014 | Xing et al. |
| 2015/0062334 A1* | 3/2015 | Dickinson .............. H04N 7/181 348/143 |

FOREIGN PATENT DOCUMENTS

WO    WO-2014083236 A1    6/2014

OTHER PUBLICATIONS

International Search Report and Written Opinion—PCT/US2015/057212—ISA/EPO—Jan. 28, 2016.

* cited by examiner

Primary Examiner — Gevell Selby
(74) Attorney, Agent, or Firm — Loza & Loza, LLP

(57) ABSTRACT

Various aspects of the present disclosure provide for a control scheme of trigger based collaborative data capturing operations utilizing a plurality of time-synchronized data capturing devices. These data capturing devices are synchronized to the same time reference so that their inputs and outputs can be coordinated and controlled in a deterministic manner.

22 Claims, 10 Drawing Sheets

COLLABORATIVE DATA CAPTURING APPARATUSES AND METHODS

TECHNICAL FIELD

Aspects of the present disclosure relate generally to data capturing, and more particularly, to data capturing using time-synchronized wireless devices.

BACKGROUND

Wireless communication networks are widely deployed to provide various communication services such as telephony, video, data, messaging, broadcasts, and so on. Such networks, which are usually multiple access networks, support communications for multiple users or wireless connected devices by sharing the available network resources. One example of such a network is the cellular telephone network such as UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP).

Cellular wireless devices can receive accurate timing or time information from the cellular network because they are synchronized for cellular operation. In the absence of cellular connectivity, other connectivity methods can also provide timing information, including satellite based timing sources (e.g., Global Positioning System (GPS)) and network based timing source (e.g., Network Time Protocol (NTP)). When connected devices are synchronized to the same timing reference, their inputs and outputs can be coordinated and controlled in a deterministic manner.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide for trigger based collaborative data capturing system utilizing a plurality of time-synchronized data capturing devices. These data capturing devices are synchronized to the same time reference so that their inputs and outputs can be coordinated and controlled in a deterministic manner based on various triggers for controlling data capturing.

In one aspect, the disclosure provides a method of operating a data capturing controller for collaborative data capturing. The data capturing controller communicates with a plurality of data capturing devices, wherein the data capturing controller and the plurality of data capturing devices are synchronized to a same timing reference of a communication network. The data capturing controller manages a plurality of triggers for controlling data capturing utilizing one or more of the data capturing devices. The data capturing controller transmits one or more requests to one or more of the data capturing devices to capture data based on the plurality of triggers. The data capturing controller receives captured data from the one or more data capturing devices.

Another aspect of the disclosure provides a method of operating a first data capturing device for collaborative data capturing. The first data capturing device receives a first request from a data capturing controller to start data capture based on a first trigger in collaboration with one or more second data capturing devices. The first and second data capturing devices and the data capturing controller are synchronized to a same timing reference of a communication network. If the first trigger is satisfied, the first data capturing device starts data capture in collaboration with at least one of the second data capturing devices. The first data capturing device tags captured data with time information and transmits the captured data to the data capturing controller.

Another aspect of the disclosure provides a data capturing controller for collaborative data capturing. The data capturing controller includes a network interface configured to communicate with a plurality of data capturing devices. The data capturing controller and the plurality of data capturing devices are synchronized to a same timing reference of a communication network. The data capturing controller further includes a recording control block configured to manage a plurality of triggers for controlling data capturing utilizing one or more of the data capturing devices. The data capturing controller further includes a capturing manager block that, utilizing the network interface, is configured to: transmit one or more requests to one or more of the data capturing devices to capture data based on the plurality of triggers; and receive captured data from the data capturing devices.

Another aspect of the disclosure provides a first data capturing device for collaborative data capturing. The first data capturing device includes a network interface configured to communicate with a data capturing controller and one or more second data capturing devices. The first data capturing device further includes a capturing control block and a time code block. The capturing control block is configured to receive a first request from the data capturing controller to start data capture based on a first trigger in collaboration with the one or more second data capturing devices. The first and second data capturing devices and the data capturing controller are synchronized to a same timing reference of a communication network. The capturing control block is further configured to if the first trigger is satisfied, start data capture in collaboration with at least one of the second data capturing devices, and transmit the captured data to the data capturing controller. The time code block is configured to tag the captured data with time information.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the present disclosure provide for a control scheme of trigger based collaborative data capturing operations utilizing a plurality of time-synchronized data capturing devices. These data capturing devices are synchronized to the same time reference so that their inputs and outputs can be coordinated and controlled in a deterministic manner. In the illustrated examples below, the data capturing devices may receive accurate time information from a cellular network or other sources. In some aspects of the disclosure, the data capturing devices may receive time information from sources such as satellite or network based sources. In some examples, the data capturing devices can collaboratively perform certain data capturing functions such as image capturing, video capturing, or any data capturing operations in accordance with various triggers managed by a capturing control entity. The data captured by the capturing devices are tagged with time codes such that they can utilized in a time-synchronized manner. Collaborative capturing involves two or more time-synchronized data capturing devices that are controlled by a control entity to perform certain data capturing operations based on certain triggers managed by the capturing control entity.

Figure 1:
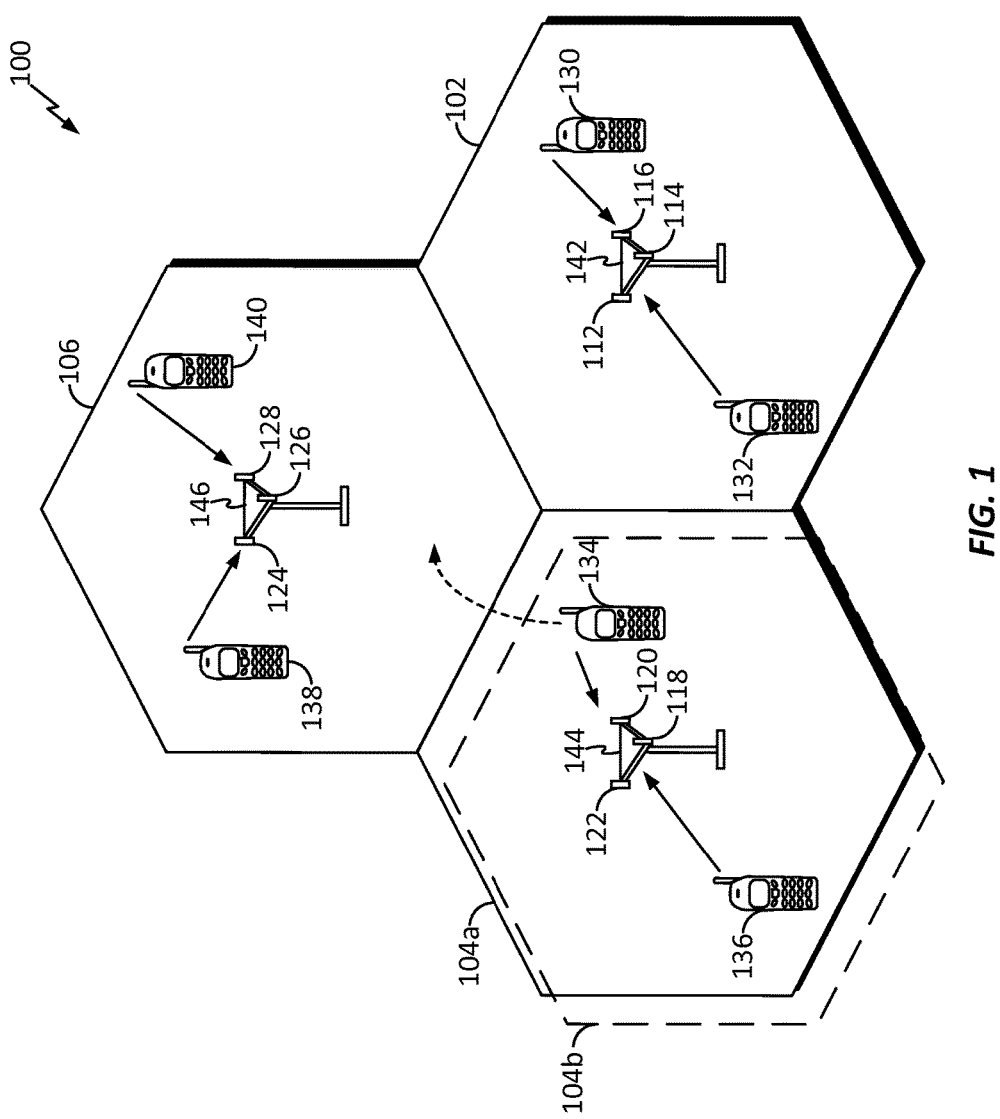
FIG. 1 is a diagram illustrating an example of a radio access network in accordance with aspects of the present disclosure.

The various concepts presented throughout this disclosure may be implemented across a broad variety of telecommunication systems, network architectures, and communication standards. FIG. 1 is a diagram illustrating one example of a radio access network (RAN) 100 that may be utilized in accordance with the present disclosure. In one example, the RAN 100 may be a RAN utilized in a UMTS system. The RAN 100 includes multiple cellular regions (cells), including cells 102, 104, and 106, each of which may include one or more sectors. Cells may be defined geographically (e.g., by coverage area) and/or may be defined in accordance with a frequency, scrambling code, etc. That is, the illustrated geographically-defined cells 102, 104, and 106 may each be further divided into a plurality of cells, e.g., by utilizing different scrambling codes. For example, cell 104a may utilize a first scrambling code, and cell 104b, while in the same geographic region and served by the same Node B 144, may be distinguished by utilizing a second scrambling code.

In a cell that is divided into sectors, the multiple sectors within a cell can be formed by groups of antennas with each antenna responsible for communication with UEs in a portion of the cell. For example, in cell 102, antenna groups 112, 114, and 116 may each correspond to a different sector. In cell 104, antenna groups 118, 120, and 122 may each correspond to a different sector. In cell 106, antenna groups 124, 126, and 128 may each correspond to a different sector.

The cells 102, 104, and 106 may include several user equipment (UEs) that may be in communication with one or more sectors of each cell 102, 104, or 106. For example, UEs 130 and 132 may be in communication with Node B 142, UEs 134 and 136 may be in communication with Node B 144, and UEs 138 and 140 may be in communication with Node B 146. Here, each Node B 142, 144, and 146 may be configured to provide an access point to a core network for all the UEs 130, 132, 134, 136, 138, and 140 in the respective cells 102, 104, and 106.

During a call with a source cell, or at any other time, the UE 136 may monitor various parameters of the source cell as well as various parameters of neighboring cells. Further, depending on the quality of these parameters, the UE 136 may maintain communication with one or more of the neighboring cells. During this time, the UE 136 may maintain an Active Set, that is, a list of cells to which the UE 136 is simultaneously connected (e.g., the UTRAN cells that are currently assigning a downlink dedicated physical channel DPCH or fractional downlink dedicated physical channel F-DPCH to the UE 136 may constitute the Act.

In FIG. 1, any of the UEs may be a data capturing device, and receives a reference timing from a primary reference clock of the RAN 100. In some examples, some or all of the UEs may have additional data connectivity. For example, the UEs may be equipped with Ethernet, WiFi, Bluetooth, or other network connectivity. Thus, the UEs may communicate (e.g., send and/or receive data) with other devices or entities via any of the available data network connectivity including the cellular network (e.g., RAN 100). Any of the Node Bs 142, 144, and 146 may be a data capturing controller that can utilize the UEs and other data capturing devices to perform collaborative data capturing.

Figure 2:
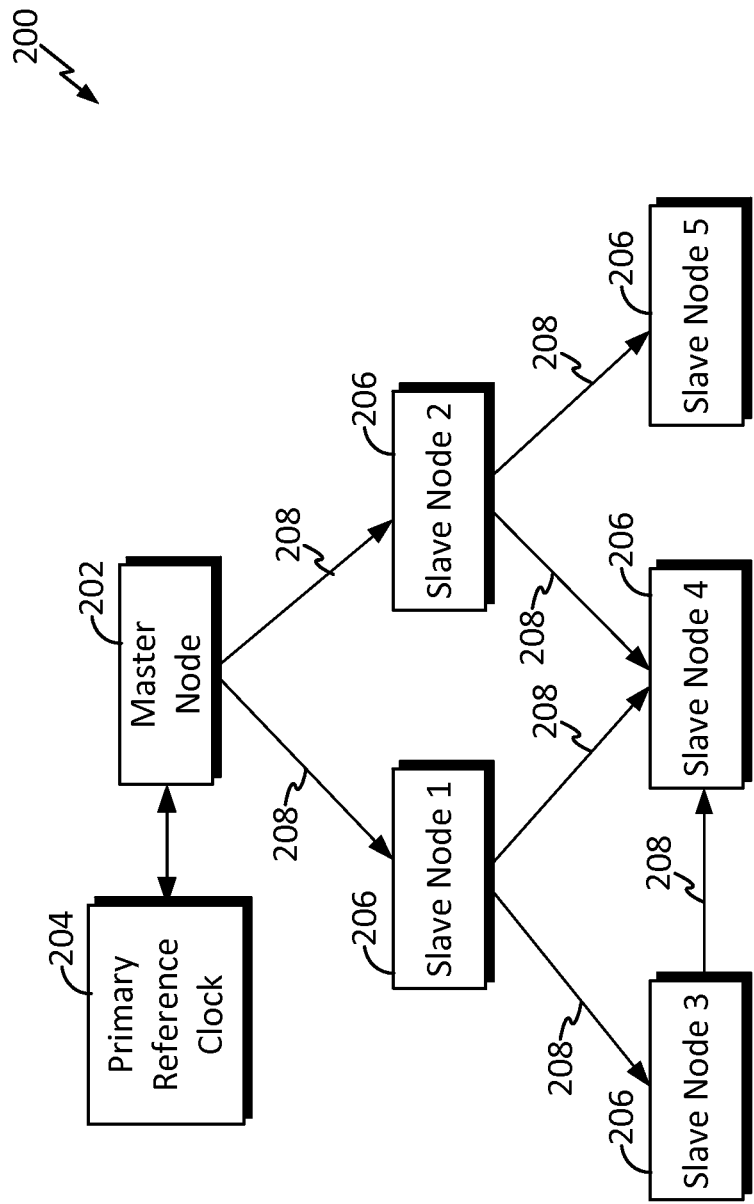
FIG. 2 is a diagram illustrating a network including a master node and a number of slave nodes synchronized to a primary reference clock in accordance with aspects of the present disclosure.

FIG. 2 is a diagram illustrating a communication network 200 including a master node 202 coupled to a primary reference clock (PRC) 204 and a number of slave nodes 206 in accordance with aspects of the disclosure. The communication network 200 may be a UMTS network or any suitable communication networks. Detailed information on synchronization of a UMTS network is described in the 3GPP Technical Specification (TS) 25.402, Synchronization in UTRAN Stage 2, Release 12. The entire content of this 3GPP TS is incorporated herein by reference.

Referring to FIG. 2, each of the slave nodes 206 synchronizes its internal clock to the PRC 204 using data received on an incoming data link 208. The master node 202 distributes time information or highly accurate clock signals (generated by the PRC 204) to all slave nodes 206. While the communication network 200 is shown in a particular hierarchical order in FIG. 2, the network 200 may have any suitable network hierarchy. In one example, the master node 202 distributes time information to adjacent or directly connected slave nodes which in turn may regenerate and distribute the received time information to adjacent nodes until all the nodes in the network 200 receive the time information. In some examples, the master node 202 may be a radio network controller (RNC), and the slave nodes may be the Node Bs and/or UEs illustrated in FIG. 1.

In a cellular access network, like the RAN 100, the UEs, Node Bs, and RNCs are synchronized to the same reference time source to ensure reliable communication within the network and handoffs between base stations. To that end, a highly accurate reference clock (e.g., PRC 204) is distributed throughout the entire network. Therefore, the internal clocks of the connected devices or nodes within the network are synchronized to the same reference clock. For example, devices (e.g., UEs and Node Bs) utilized in UMTS and GSM networks are synchronized to an accuracy of 5 parts in 108 milliseconds (ms) or 4.3 ms. While cellular networks are used as illustrative examples, the present disclosure is not limited to cellular networks and may be applied to other suitable communication networks.

Figure 3:
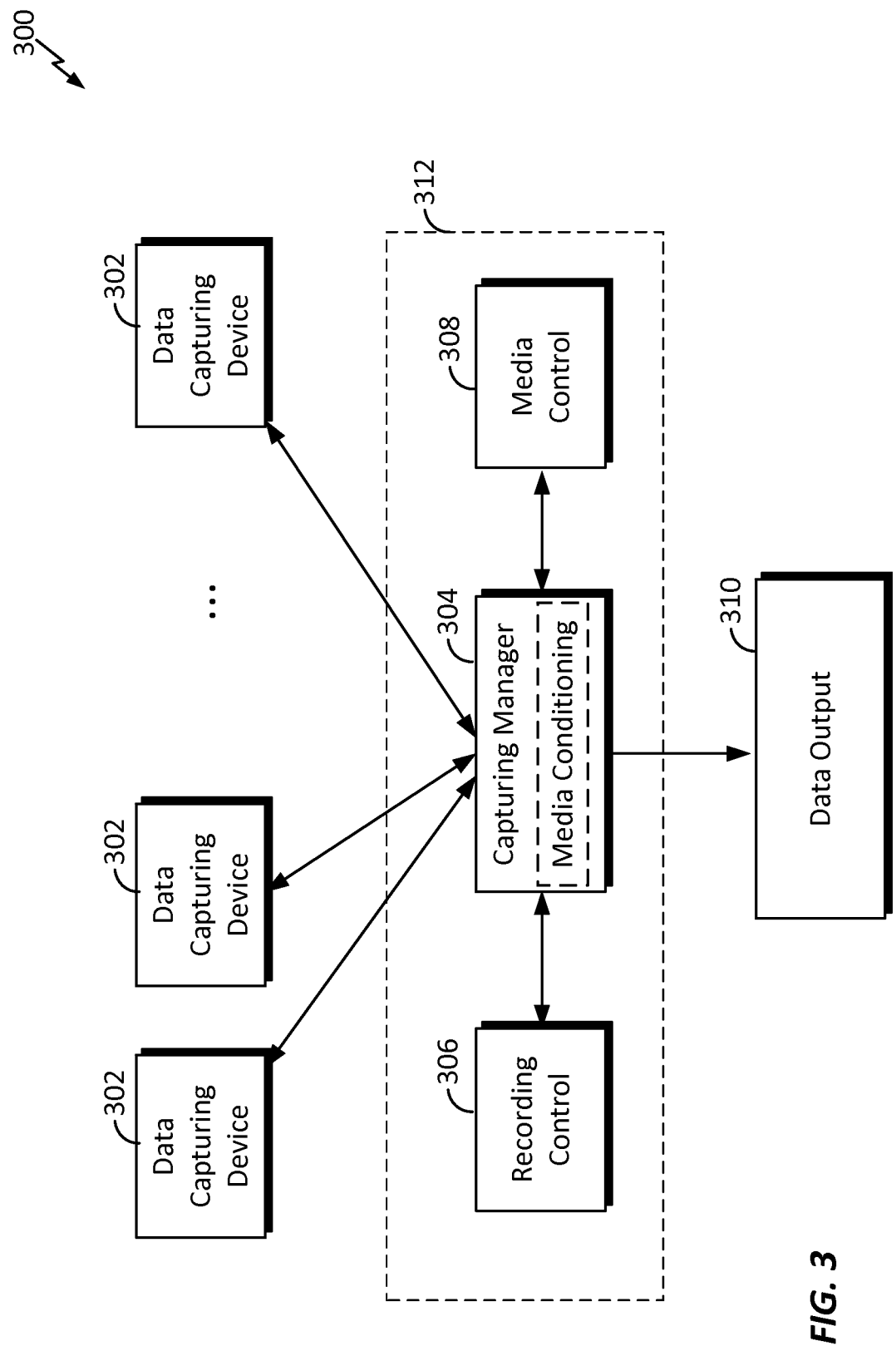
FIG. 3 is a diagram illustrating a data capturing system including two or more time-synchronized data capturing devices configured to collaboratively capture data and provide time-coded outputs in accordance with aspects of the present disclosure.

FIG. 3 is a diagram illustrating a data capturing system 300 including two or more time-synchronized data capturing devices 302 controlled by a data capturing entity to collaboratively capture data and provide time-coded outputs in accordance with some aspects of the present disclosure. In one example, one or more of the data capturing devices 302 may be any of the UEs, slave nodes, or apparatus illustrated in FIGS. 1, 2 and/or 4. The data capturing devices 302 are time synchronized to the same time reference, and may utilize any suitable connectivity to receive accurate time information from the same time reference. For example, the data capturing devices 302 may have cellular network connectivity and are synchronized to a cellular network primary time reference such as the PRC 202. The data capturing devices 302 can be controlled to collaboratively perform data capturing using a set of time or event based triggers and provide time-coded outputs. In some examples, the timing information may be based on Coordinated Universal Time (UTC) (or Universal Time) or any suitable formats.

In some aspects of the disclosure, the data capturing devices 302 may include one or more sensors that can capture information and generate corresponding data. For examples, the data capturing devices 302 may have sensors for recording images, audios, videos, and/or any desired information; and generating corresponding time coded data. For example, the generated data may be time coded audio and/or video data. In one example, the captured data may be tagged with a Society of Motion Picture and Television Engineers (SMPTE) timecode. A SMPTE timecode can identify a precise location in time-based media like audio or video media. SMPTE timecodes may be added to film, video, and/or audio material. They provide a time reference for editing, synchronization, and identification. For example, SMPTE timecode can provide hours, minutes, seconds, and frames information. In other aspects of the disclosure, the data capturing devices 302 may output data in any suitable formats. In some examples, for audio and/or video data, the output data may be in Moving Picture Experts Group (MPEG) formats (e.g., MPEG-1, MPEG-2, or MPEG-4) or other suitable data formats, which can be stored, forwarded, or streamed to a capturing manager 304.

The data capturing devices 302 and the capturing manager 304 may communicate with each other via any suitable data connectivity such as the Internet, intranet, and/or cellular network connection. For example, the capturing manger 304 sends control commands or requests to the data capturing devices 302, and receives captured data from the data capturing devices 302. The capturing manager 304 coordinates data capturing and playback activities of the data capturing devices 302. In one aspect of the disclosure, the capturing manager 304 acts as an intermediary between the data capturing devices 302, a recording control entity 306, and a media control entity 308. The capturing manager 304, the recording control entity 306, and the media control entity 308 may be collectively referred to as a capturing control entity, which may include one or more devices located in the same location or different locations. The capturing manager 304 can receive, store, and/or buffer the captured data (e.g., audio and/or video data) from the data capturing devices 302. In some examples, the capturing manager 304 may be referred to as an audio/video manager in audio/video capturing applications. However, the capturing manager 304 is not limited to audio and/or video data capturing applications. In other aspects of the disclosure, the capturing manager 304 may be utilized to receive, store, buffer, forward, and/or output any data generated by any of the data capturing devices 402.

The recording control entity 306 controls when data capturing (e.g., recording) starts and/or stops, and determines which data capturing device(s) 302 are to be involved in data capturing. In some aspects of the disclosure, the recording control entity 306 may determine the recording parameters for one or more of the capturing devices 302 in the system. The recording parameters may depend on the data formats recorded by a data capturing device 302. For example, for video capturing applications, the parameters may include the desired video standard (e.g., MPEG4, H.256, NTSC and PAL) and associated configurable parameters such as compression, resolution, frame rate, etc. Similarly, for audio capturing applications, examples of the parameters may include the compression standard and other parameters such as coding and rate (e.g., MP3 320 Kbps).

In some aspects of the disclosure, the capturing manager 304 and/or the recording control entity 306 may query the data capturing device 302 to determine its capabilities, and then based on that to determine achievable parameters. In some examples, the capturing manager 304 and/or the recording control entity 306 may negotiate the parameters with a capturing device 302 utilizing a configuration procedure available in the applicable standard being used for the capturing/recording.

In some aspects of the disclosure, a data capturing device 302 may be configured with default (or predetermined) parameters in an initial setup phase when a data capturing device comes online. Once the default parameters are agreed (i.e., not changed or confirmed) between the data capturing device and the recording control entity 306 and/or capturing manager 304, the default parameters can be used. In some examples, these defaults parameters may be overridden and new defaults provided or overridden on a case by case basis, through a suitable configuration mechanism operable at the data capturing device 302. In some aspects of the disclosure, any of the recording control entity 306, the capturing manager 304, and/or the media control entity 308 may manage or change the configuration.

The data capturing devices 302 and the recording control entity 306 may communicate with each other via any suitable data connectivity such as the Internet, intranet, and/or a cellular network connection. In one particular example, the data capturing devices 302 may be cameras or camcorders for capturing images and/or videos. The recording control entity 306 maintains one or more triggers for starting and/or stopping data capturing for any particular data capturing devices 302. In some examples, the triggers may be generated at one or more of the data capturing devices 302 and communicated to the recording control entity 306 directly or indirectly through the capturing manager 304. In other examples, the triggers may be entered or created through interaction with the recording control entity 306. In one example, the recording control entity 306 may provide a user interface for interacting with a user. Through the user interface, a user can create various triggers to start and/or stop data capturing utilizing one or more data capturing devices 302. The recording control entity 306 is also responsible for managing and coordinating the various triggers across the system. For example, the recording control entity 306 determines which data capturing device(s) 302 to participate in data capturing, and communicates the corresponding requests to the capturing manager 304, which communicates the requests to the corresponding data capturing devices 302.

In some aspects of the disclosure, the recording control entity 306 can utilize and manage various time and event based triggers to control the data capturing devices 302. Some non-limiting examples of the triggers are: time based triggers, location based triggers, motion based triggers, speed based triggers, force based triggers, light based triggers, sound based triggers, scene movement based triggers, phone call based triggers, text message based triggers, and data communication based triggers. Based on the triggers, the recording control entity 306 sends capturing requests to the capturing manager 304. The capturing manager 304 processes the requests and responds back to the recording control entity 306 to acknowledge taking successful action (i.e., starting and/or stopping capturing at the selected capturing devices 302) on the requests. For example, the capturing manager 304 can issue start requests to one or more capturing devices 302 that are required to start recording. The capturing manager 304 also can issue stop requests to the capturing devices 302, based on requests received from the recording control entity 306. Start/stop requests may arrive at the capturing manager 304 together or separately.

With time based triggers, the capturing manager 304 can request one or more data capturing devices 302 to start and/or stop data capturing at a specified time. In some examples, the data capturing devices 302 may be requested to start or stop capturing as soon as the corresponding request is received. In some examples, the data capturing devices 302 may be requested to start or stop capturing a certain UTC time.

With location based triggers, the capturing manager 304 can request one or more data capturing devices 302 to start and/or stop data capturing based on the location of the devices. In some aspects of the disclosure, the data capturing devices 302 may be configured to determine location using satellite positioning (e.g., GPS), triangulation techniques, or any suitable methods. For example, a data capturing device may start capturing when it is within a certain region, and stop capturing when it leaves the region.

With motion based triggers, the capturing manager 304 can request one or more data capturing devices 302 to start and/or stop data capturing when certain motion or change in position is detected. Some non-limiting examples of motion triggers are motion detected, no motion detected, acceleration, deceleration, change in direction, etc.

With speed based triggers, the capturing manager 304 can request one or more data capturing devices 302 to start and/or stop data capturing based on the speed of the data capturing device 302. In some examples, the data capturing devices 302 may start or stop data capturing at a selected speed, above or below a certain speed, or when a change in speed is detected. The data capturing device 302 may determine its speed based on satellite signals.

With force based triggers, the capturing manager 304 can request one or more data capturing devices 302 to start and/or stop data capturing based on a force or pressure sensed by the data capturing device 302. In some examples, the data capturing device 302 may have one or more force or pressure sensors to detect force and/or pressure. When the detected force and/or pressure satisfy a desired trigger condition, the data capturing device 302 may start or stop data capturing.

With light based triggers, the capturing manager 304 can request one or more data capturing devices 302 to start and/or stop data capturing based on the amount or characteristics of light detected by the data capturing device. In some examples, the data capturing device 302 may have one or more light sensors or photodetectors for detecting light or any electromagnetic waves in any desired wavelengths. The presence (or absence) of light, the characteristics, and/or intensity of the detected light or electromagnetic waves may be used to satisfy the trigger condition.

With sound based triggers, the capturing manager 304 can request one or more data capturing devices 302 to start and/or stop data capturing based on the sound or audio detected by the data capturing device. In some examples, the data capturing device 302 may have one or more acoustic sensors or microphones for detecting audio or sound. The presence (or absence) of sound and certain characteristics of the detected audio/sound may be used to satisfy the trigger condition.

With scene movement based triggers, the capturing manager 304 can request one or more data capturing devices 302 to start and/or stop data capturing based on certain detected scene movement or changes. In some examples, the data capturing device 302 may have one or more imaging devices or cameras for capturing an image, a picture, or a video of a scene. In one example, the trigger condition is met when a substantial change is detected in a scene. In some examples, the trigger condition may be any change in the image, recognition of any object entering a scene, recognition of a specific object or object type entering the scene (e.g., any human being), and recognition of emergency in a scene (e.g., fire, smoke).

With phone call based triggers, the capturing manager 304 can request one or more data capturing devices 302 to start and/or stop data capturing based on the device's status related to call handlings. In some examples, call handling status includes starting a call, ending a call, incoming call, call waiting, etc.

With text message or instant message based triggers, the capturing manager 304 can request one or more data capturing devices 302 to start and/or stop data capturing based on a received text message. In one example, the data capturing device 302 may start or stop capturing when a certain text message is received. The text message may include a predetermined message such as "START," "STOP," or any suitable messages that can cause the data capturing device 302 to start and/or stop capturing as soon as the message is received or at a certain time later. One non-limiting example of the text message may be a Short Message Service (SMS) message. The text message may be sent by any suitable entities including the recording control entity 306, capturing manager 304, and another data capturing device 302. In some examples, a user can trigger a specific recording event by sending a text message or an instant message to the capturing manager 304, the recording control entity 306, and/or the data capturing device 302. IN some aspects of the disclosure, the data capturing system 300 may be preconfigured to accept such messages only from allowed sources to act as triggers for one or more of data capturing devices 302.

With data communication based triggers, the capturing manager 304 can request one or more data capturing devices 302 to start and/or stop data capturing based on certain types of data communication performed at the data capturing device. In some examples, a user can trigger a specific recording event via a website or a mobile application that communicates the request to the capturing manager 304, the recording control entity 306, and/or the data capturing device 302.

In the above described examples, the captured data is tagged with one or more time codes (e.g., SMPTE codes). Therefore, the capturing manager 304 may synchronize the data captured by multiple data capturing devices 302. The data capturing devices 302 can be controlled using one or more of the triggers described above. In some examples, different groups of data capturing devices may be controlled by different triggers.

The media control entity 308 controls real-time data streaming from one or more data capturing devices 302 and playback of previously captured and stored content. Previously captured (or recorded) data may be stored at the respective data capturing devices 302, the capturing manager 304, and/or a remote storage (e.g., a cloud storage). In some aspects of the disclosure, the media control entity 308 sends the requests for data streaming or playback of the desired data capturing device(s) 302 to the capturing manager 304. Then, the capturing manager 304 communicates the requests to the corresponding data capturing device(s) 302 for live streaming. For previously captured data stored at the capturing manager 304, the media control entity 308 can request the captured data from the capturing manager 304 directly. The media control entity 308 provides user selection and mixing of data streams or playback from one or more data capturing devices 302. The streaming or playback can be time-synchronized based on the time code of the captured data.

The capturing manager 304, recording control entity 306, and media control entity 308 may be collectively referred to as a capturing control entity 312, which may be implemented as a single device or multiple devices. In some examples, the multiple devices of a capturing control entity 312 may be physically located at different locations and operatively coupled to each other, for example, through a data connection (e.g., Internet, intranet, cellular network). In some aspects of the disclosure, the capturing manager 304 can aggregate, mix, and/or buffer the captured data (e.g., real-time data streams) from multiple data capturing devices before providing a combined data output 310. In one example, the data output 310 may be a real-time audio or video stream including the data streams from multiple capturing devices (e.g., cameras). For live or recorded content playback, the media control entity 308 may additionally provide for various data processing or conditioning algorithms to be selected and applied to the content via the capturing manager 304.

In one aspect of the disclosure, the capturing manager 304 may include a media conditioning controller. In some examples, the media conditioning controller may be a separate entity that can co-exist with the capturing manager 304. The media conditioning controller may perform certain conditioning or processing on live streamed or stored data, prior to its presentation as the data output 310. Non-limiting examples of the processing or conditioning include multi-stream selection, mashup, coercion (into single stream), resolution, and format management and conformance, etc. The captured data may be processed or conditioned prior to its storage at the capturing manager 304 and/or the data capturing device.

In one example, the media control entity 308 may request the capturing manager 304 to perform the desired data processing algorithms on the captured data. In one particular example, a three dimension (3D) algorithm may be applied to a selection of content streams recorded or captured for a certain event (e.g., a concert) by multiple data capturing devices 302. These devices 302 may be located at different positions when capturing the event. Therefore, a 3D or multiple-angle video may be produced from the data streams captured by these data capturing devices 302. In some other examples, various algorithms may be utilized to make a mashup, blending, or mixing using different data content (e.g., audio and video) based on a set of specified criteria.

Figure 4:
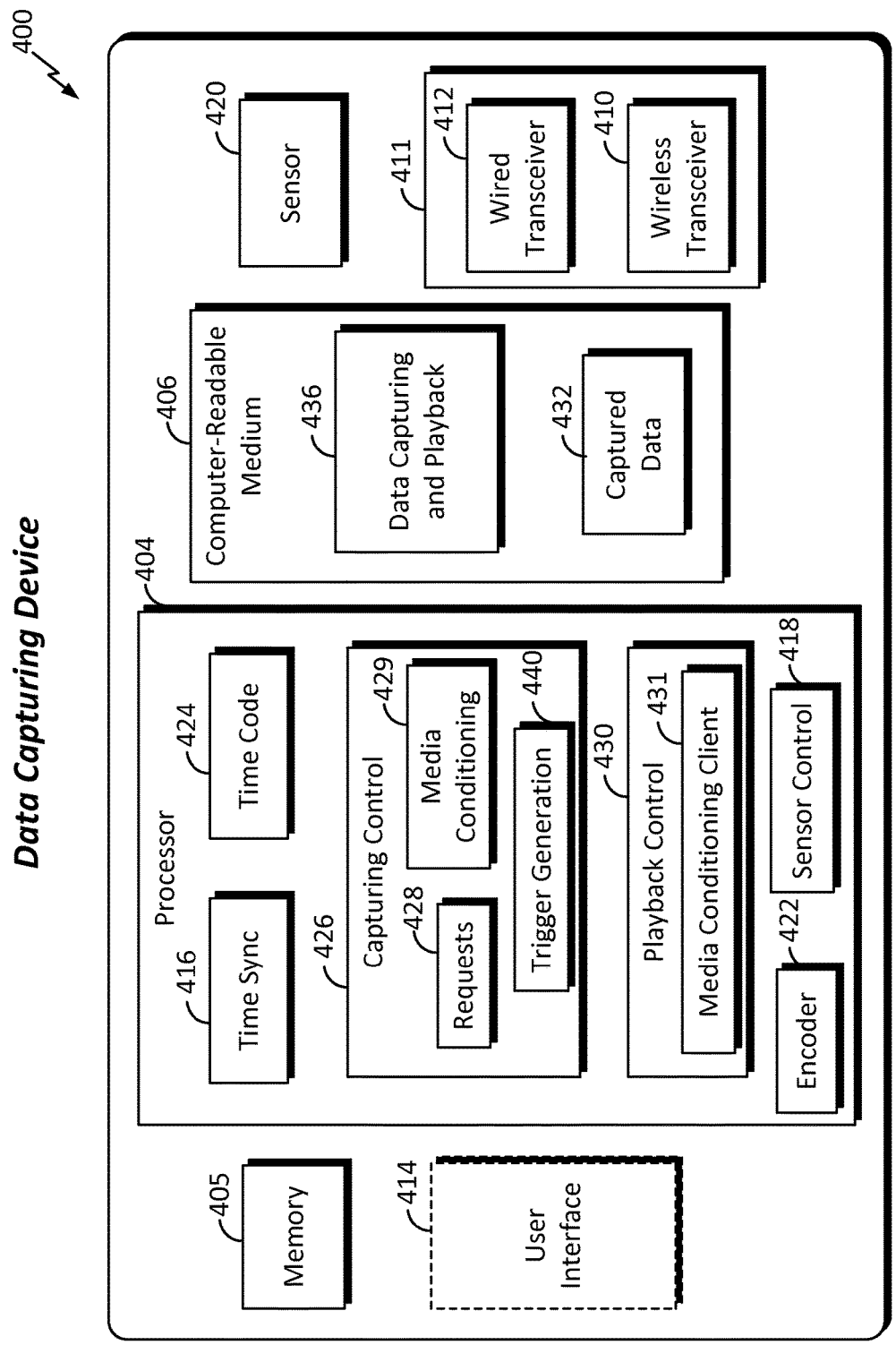
FIG. 4 is a diagram illustrating an example of a hardware implementation for a data capturing device configured to capture data in collaboration with one or more other data capturing devices in accordance with an aspect of the disclosure.

FIG. 4 is a diagram illustrating an example of a hardware implementation for a data capturing device 400 configured to capture data in collaboration with one or more other data capturing devices according to an aspect of the disclosure. The various blocks or components of the data capturing device 400 illustrated in FIG. 4 may be implemented in software, firmware, hardware, or a combination thereof. In one example, the apparatus 400 may be a user equipment (UE) as illustrated in FIG. 1 or a data capturing device 302 of FIG. 3. In some examples, the data capturing device 400 may be any data capturing device with cellular connectivity. The data capturing device 400 includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 404, as utilized in the data capturing device 400, may be used to implement any one or more of the processes described below and illustrated in FIGS. 6-10.

In this example, the data capturing device 400 may be implemented with a bus architecture. The bus may include any number of interconnecting buses and bridges depending on the specific application of the processing system 414 and the overall design constraints. The bus links together various circuits including one or more processors (represented generally by the processor 404), a memory 405, and computer-readable media (represented generally by the computer-readable medium 406). The bus may also link various other circuits such as timing sources, peripherals, voltage regulators, and power management circuits, which are well known in the art, and therefore, will not be described any further. The data capturing device 400 also includes a network interface 411 for communicating with other devices over one or more data networks (e.g., Internet, intranet, LAN, cellular, etc.). The network interface 411 may include one or more wired transceiver 412 and wireless transceiver 410 to enable one or more wireless and/or wired connections (e.g., Ethernet, Bluetooth, WiFi, cellular, etc.). Depending upon the nature of the apparatus, a user interface 414 (e.g., keypad, display, speaker, microphone, joystick, touchpad, touchscreen) may also be provided.

The processor 404 includes a time sync block 416 that can synchronize the local time of the data capturing device 400 to a reference time. For example, the processor 404 may receive a cellular network reference time (e.g., PRC 204 of FIG. 2) via the wireless transceiver 410. The data capturing device 400 may synchronize its local time with the cellular reference time at startup, at predetermined time(s), and/or intervals. In other aspects of the disclosure, the time sync block 416 may also synchronize the local time to other time references received from other sources such as satellites, data networks (e.g., NTP), and broadcasted time signals (e.g., clock signals broadcasted by the National Institute of Standards and Technology).

The processor 404 includes a sensor control block 418 that can control one or more sensors (represented as a sensor 420). The sensor 420 when activated can capture various data depending on the type of the sensor being used. In one example, the sensor 420 may be an image sensor that can capture still images and/or videos. The processor 404 provides an encoder 422 for encoding the data generated by the sensor 420 in various formats. For example, the encoder 422 can encode image data in JPEG or GIF format and video data in various MPEG formats. The processor 404 may utilize a time code block 424 to tag the captured sensor data with one or more time codes (e.g., SMPTE codes) indicating the time at which the data was captured. For example, image type data may be tagged with a single time code corresponding to the time when the image was captured. Video type data may be tagged with one or more time codes each corresponding to a specific time point of the captured video.

The processor 404 also includes a capturing control block 426 that provides various data capturing control functions based on one or more capturing requests 428 similar to those described in relation to FIG. 3 above. For examples, the requests 428 may direct the data capturing device 400 to start or stop data capture as soon as the request is received, at a specific time, or when a certain event (i.e., trigger condition) occurs. The capturing control block 426 may receive the requests 428 from a control entity (e.g., a capturing control entity 312) via the network interface 411. In some examples, a trigger generation block 440 may be provided for generating and sending (transmitting) one or more triggers similar to those described above in reference to FIG. 3, to a capturing control entity via the network interface 411. The trigger generation block 440 may be included in the capturing control block 426 or as a separate component in some examples. The capturing control block 426 can start or stop data capturing utilizing the sensor 420 based on the requests 428.

The processor 404 further provides a playback control block 430 that can control how captured data is stored, processed, conditioned, provided, or streamed to other devices via the network interface 411. The captured data 432 may be stored in the memory 405 and/or the computer-readable medium 406. The captured data may be streamed to other devices in real-time or at a later time upon request.

The processor 404 is also responsible for general processing, including the execution of software stored on the computer-readable medium 406. The software, when executed by the processor 404, causes the data capturing device 400 to perform the various functions described in FIGS. 6-10. The computer-readable medium 406 may also be used for storing data that is manipulated by the processor 404 when executing software. For example, the software may include data capturing and playback instructions 436 that when executed configure the various components and circuitry of the data capturing device 400 to perform the functions described in FIGS. 6-10.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 406 or a remote storage (e.g., a cloud storage). The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include any suitable medium for storing and transmitting software and/or instructions that may be accessed and read by a computer. In some examples, the computer-readable medium 406 may reside in the data capturing device 400, external to the data capturing device 400, or distributed across multiple entities (e.g., data cloud) including the data capturing device 400. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 5:
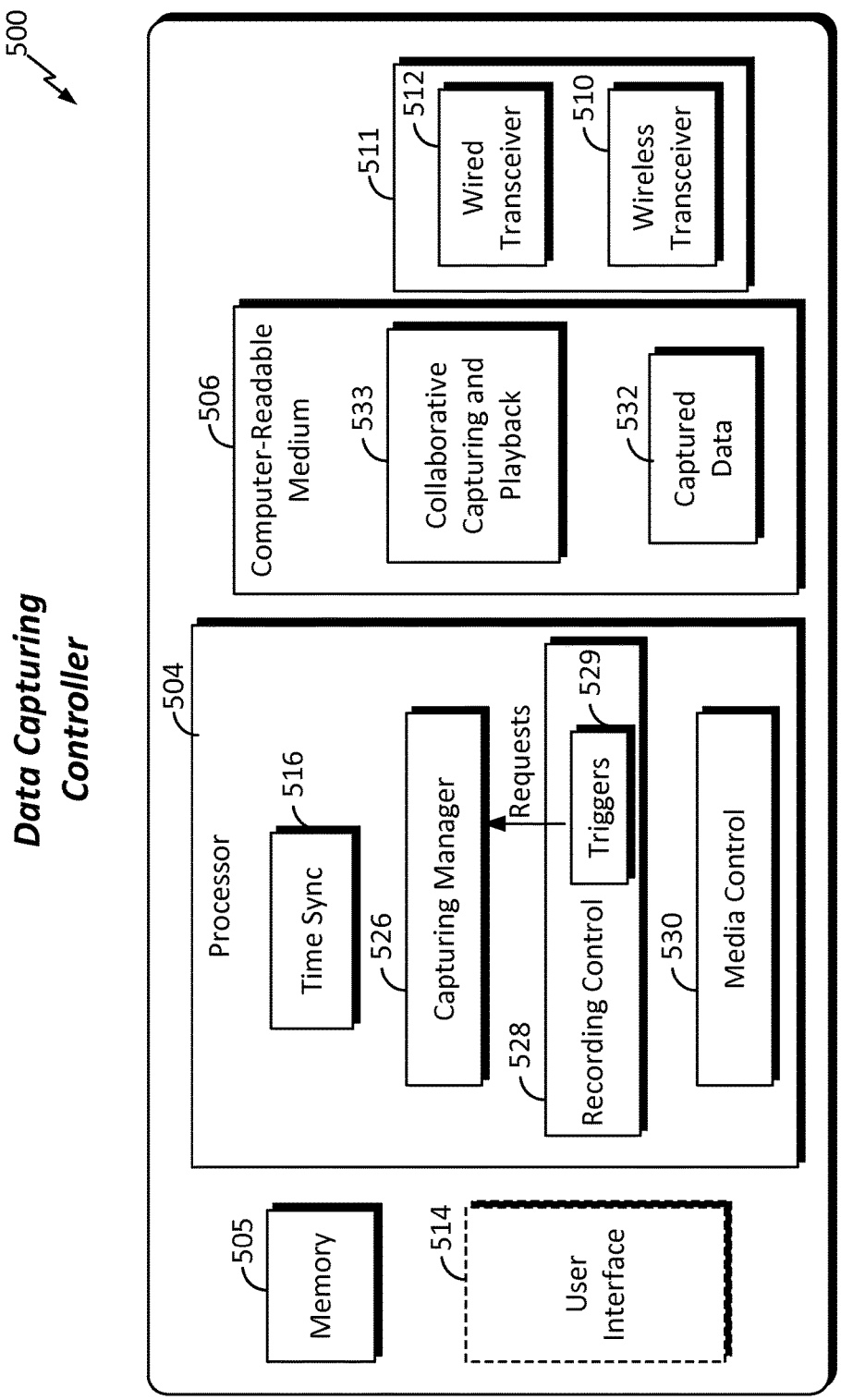
FIG. 5 is a diagram illustrating an example of a hardware implementation for a data capturing controller configured to control one or more data capturing devices to collaboratively capture data in accordance with an aspect of the disclosure.

FIG. 5 is a diagram illustrating an example of a hardware implementation for an data capturing controller 500 configured to control one or more data capturing devices to collaboratively capture data according to an aspect of the disclosure. The data capturing controller 500 includes one or more processors (represented generally by the processor 504) for performing various functions. The various blocks of FIG. 5 may be implemented in software, firmware, hardware, or a combination thereof. In one example, the data capturing controller 500 may be included in a user equipment (UE), a Node B, or an RNC as illustrated in FIG. 1. In one particular example, the data capturing controller 500 may be a separate server with network and/or cellular connectivity. In some examples, the data capturing controller 500 may be a capturing control entity 312 of FIG. 3 that can control one or more data capturing devices 302 to collaboratively capture data. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 504, as utilized in a data capturing controller 500, may be used to implement any one or more of the processes described below and illustrated in FIGS. 6-10.

The data capturing controller 500 includes a memory 505, a computer-readable medium 506, and other circuits such as timing sources, peripherals, voltage regulators, and power management circuits; which are well known in the art, and therefore, will not be described any further. The data capturing controller 500 has a network interface 511 for communicating with other devices. The network interface 511 includes a wireless transceiver 510 for communicating with other devices over a wireless network (e.g., a cellular network, WiFi, Bluetooth, etc.). The network interface 511 also includes a wired transceiver 512 for communicating with other devices (e.g., data capturing devices 400) over a wired data connection (e.g., Ethernet, LAN, etc.). Depending upon the nature of the apparatus, a user interface 514 (e.g., keypad, display, speaker, microphone, joystick, touchpad, touchscreen) may also be provided.

The processor 504 includes a time sync block 516 that can synchronize the local time of the data capturing controller 500 to a reference time. For example, the processor 504 may receive a cellular reference time (e.g., PRC 204 of FIG. 2) via the wireless transceiver 510. The data capturing controller 500 may synchronize its local clock with the cellular reference time at startup, at predetermined times, and/or intervals. However, the time sync block 516 may also synchronize the local time to other time references received from other sources such as satellites, data networks (e.g., NTP), and broadcasted time signals (e.g., clock signals broadcasted by the National Institute of Standards and Technology). To facilitate collaborative data capturing, the data capturing controller 500 and a plurality of data capturing devices 400 are synchronized to the same time reference.

The processor 504 also includes a capturing manager block 526 that provides various data capturing control functions. The capturing manager block 526 coordinates data capturing and playback activities of one or more data capturing devices (e.g., data capturing devices 302 or 400). For example, the capturing manager block 526 can act as an intermediary between data capturing devices, a recording control block 528, and a media control block 530. In one example, the capturing manager block 526 may be used to implement the capturing manager 304 of FIG. 3, the recording control block 528 may be used to implement the recording control entity 306 of FIG. 3, and the media control block 530 may be used to implement the media control entity 308 of FIG. 3. In some aspects of the disclosure, the capturing manager block 526, the recording control block 528, and the media control block 530 may be implemented in separate devices each including some or all of the components of the data capturing controller 500.

In some aspects of the disclosure, the capturing manager block 526, the recording control block 528, and the media control block 530 may be collectively referred to as a data capturing controller similar to the capturing control entity 312 of FIG. 3. The capturing manager block 526 can store and/or buffer captured data 532 (e.g., audio and/or video data) received from one or more data capturing devices in the memory 505 and/or computer-readable medium 506. However, the capturing manager block 526 is not limited to audio and/or video data applications. In other aspects of the disclosure, the capturing manager block 526 may be utilized to receive, store, buffer, and/or output data generated by any suitable data capturing devices. In some examples, the capturing manager block 526 may be referred to as a data manager, audio/video manager, or other suitable terminology.

The recording control block 528 can control one or more data capturing devices to collaboratively capture data. In some examples, the recording control entity 528 may specify the recording parameters for one or more of the capturing devices in the system. The recording control block 528 maintains or manages one or more triggers 529 for controlling (e.g., starting and stopping) data capturing utilizing one or more data capturing devices. In some aspects of the disclosure, the triggers 529 may be received from one or more data capturing devices 400. In some aspects of the disclosure, the triggers 529 may be entered or created through interaction with the recording control block 528, for example, via the user interface 514. The recording control block 528 may generate one or more triggers in response to a user input received by the user interface 514. The triggers 529 may be the same as those described above in relation to FIG. 3. The recording control block 528 determines which data capturing device(s) to start or stop data capturing based on the triggers 529, and communicates the corresponding requests to the capturing manager block 526, which communicates or transmits the requests to the data capturing devices, for example, via the network interface 511.

The media control block 530 can control real-time data streaming from the data capturing devices and playback of previously captured and stored content (e.g., captured data 532). Previously captured or recorded data may be stored at the respective data capturing devices or at the data capturing controller 500. For live streaming, the media control block 530 can provide user selection and mixing of data streams from one or more data capturing devices. A user can utilize the user interface 514 to interact with the media control block 530. In some examples, the capturing manager block 526 may be utilize to aggregate, mix, and buffer the real-time data streams before generating the desired data output. For recorded content playback, the media control block 530 may additionally provide for various data processing algorithms to be selected and applied to the content.

The processor 504 is also responsible for general processing, including the execution of software stored on the computer-readable medium 506. The software, when executed by the processor 504, causes the data capturing controller 500 to perform the various functions described in FIGS. 6-10 for any particular apparatus. The computer-readable medium 506 may also be used for storing data that is manipulated by the processor 504 when executing software. For example, the software may include collaborative capturing and playback instructions 533 that when executed configure the various blocks, components, and circuitry of the data capturing controller 500 to perform the functions described in FIGS. 6-10.

The software may reside on the computer-readable medium 506 or a remote storage (e.g., a cloud storage). The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may also include any suitable medium for storing and transmitting software and/or instructions that may be accessed and read by a computer. The computer-readable medium 506 may reside in the data capturing controller 500, external to the data capturing controller 500, or distributed across multiple entities including the data capturing controller 500. The computer-readable medium 506 may be embodied in a computer program product.

Figure 6:
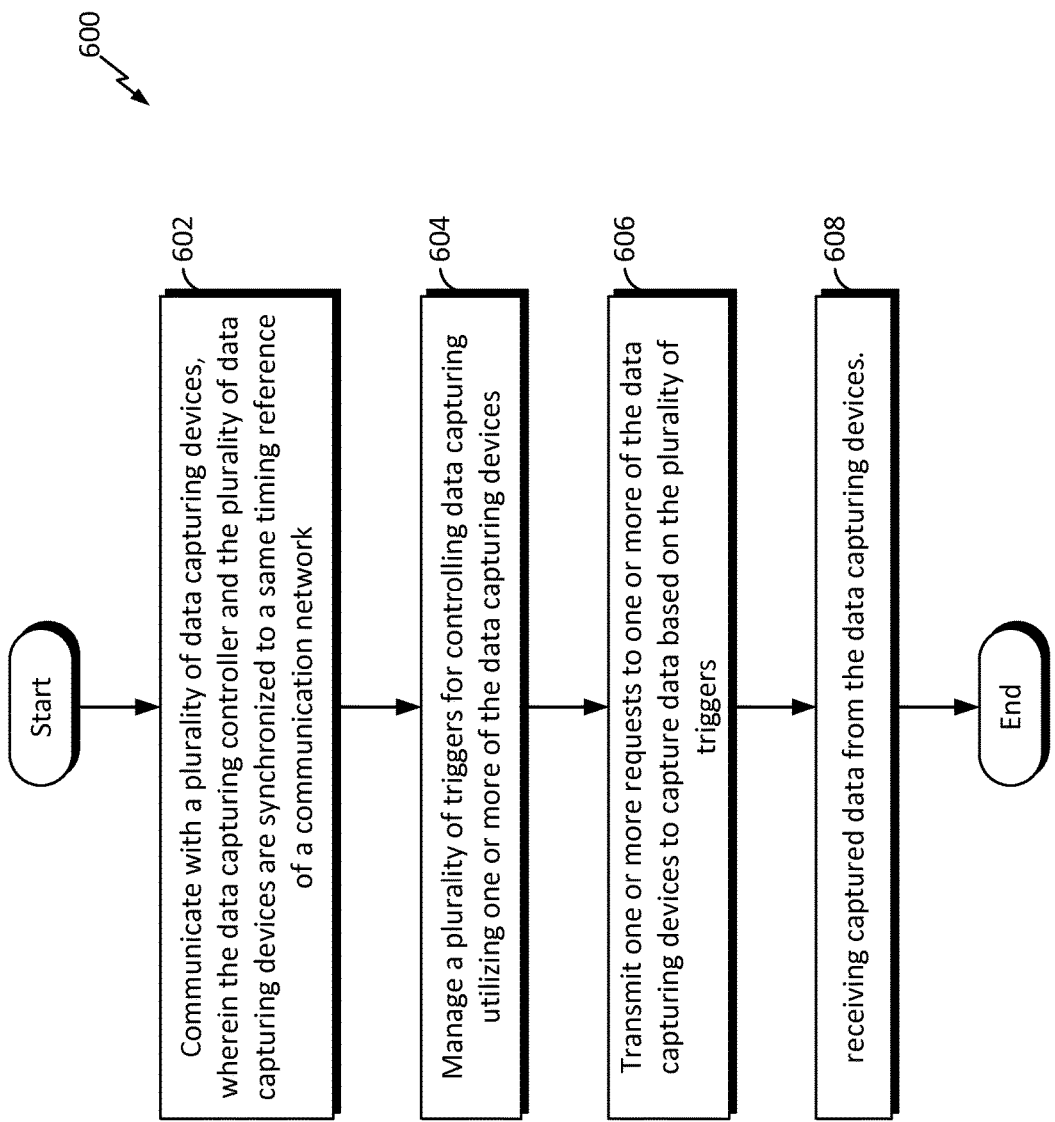
FIG. 6 is a flowchart illustrating a collaborative data capturing method operable at a data capturing controller in accordance with aspects of the present disclosure.

FIG. 6 is a flowchart illustrating a collaborative data capturing method 600 in accordance with aspects of the present disclosure. In one example, the method 600 may be performed using the data capturing controller 500 of FIG. 5 or any suitable apparatus. At block 602, a data capturing controller communicates with a plurality of data capturing devices. For example, the data capturing devices be the same as the data capturing devices 400 of FIG. 4. The data capturing controller may utilize the network interface 511 to communicate with the data capturing devices. The data capturing controller and the data capturing devices are synchronized to a same timing reference of a communication network. For example, the timing reference may be a cellular reference time (e.g., PRC 204 of FIG. 2) received via the wireless transceiver 510.

At block 604, the data capturing controller manages a plurality of triggers for controlling data capturing utilizing one or more of the data capturing devices. For example, the data capturing controller may utilize a recording control block 528 to manage a number of triggers 529 for controlling data capture. At block 606, the data capturing controller transmits one or more requests to one or more of the data capturing devices to capture data based on the plurality of triggers. For example, the recording control block 528 may send or transmit the requests to the capturing manager block 526, which then forwards, sends, or transmits the requests to the corresponding data capturing devices via the network interface 511. At block 608, the data capturing controller receives captured data from the data capturing devices. For example, the capturing manager block 526 may receive captured data from the data capturing devices via the network interface 511. The captured data may be tagged with one or more time codes.

Figure 7:
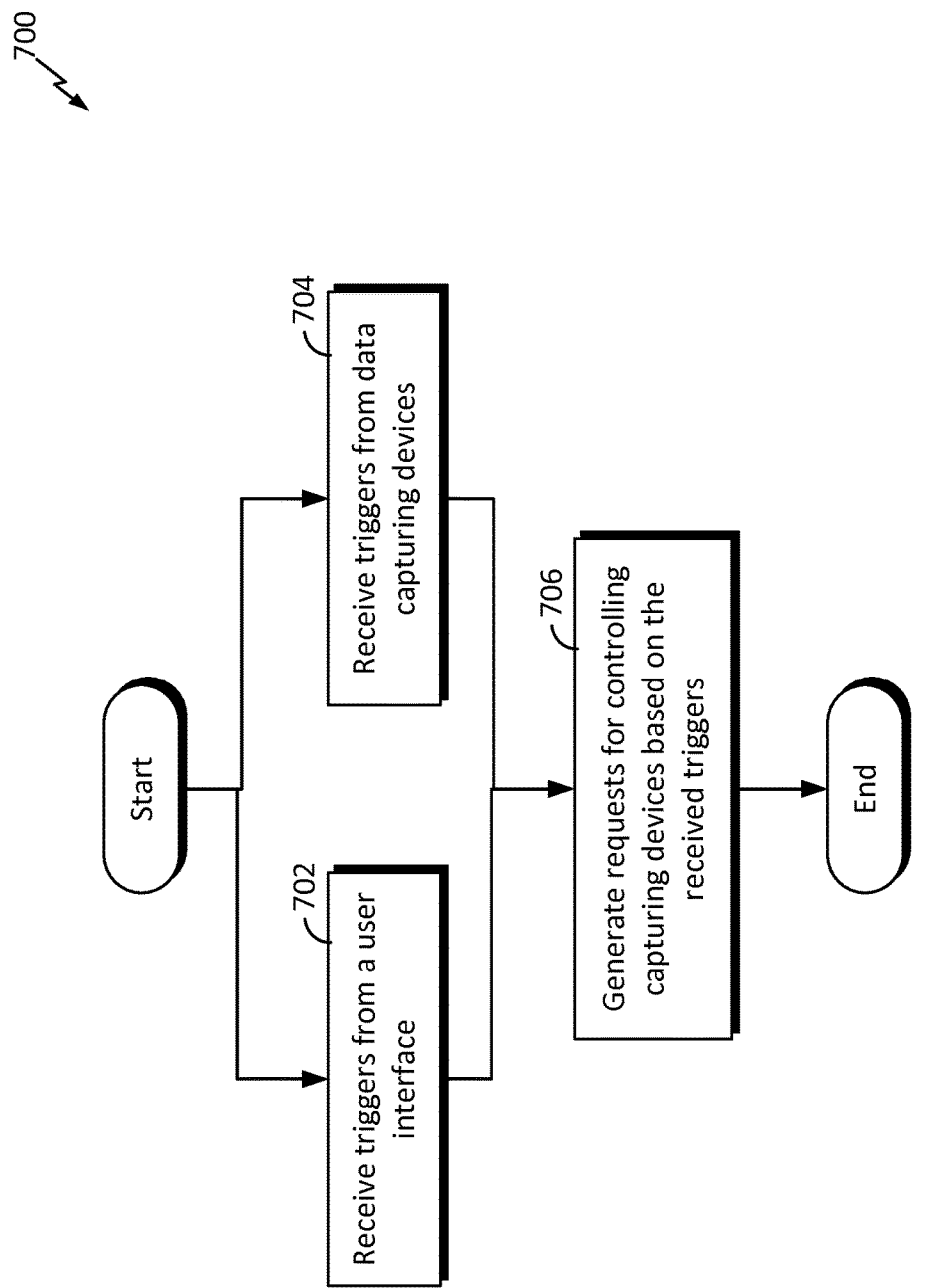
FIG. 7 is a flowchart illustrating a data capturing triggers management method in accordance with an aspect of the present disclosure.

FIG. 7 is a flowchart illustrating a data capturing triggers management method 700 in accordance with an aspect of the present disclosure. In one example, the method 700 may be performed using the data capturing controller 500 of FIG. 5 or any suitable apparatus. At block 702, the data capturing controller may receive one or more triggers from a user interface 514. A user may interact with the data capturing controller (e.g., the recording control block 528) to create one or more triggers. At block 704, the data capturing controller (e.g., the recording control block 528) may receive one or more triggers from one or more data capturing devices via the network interface 511. The triggers may be the same as those described above in reference to FIG. 3. At block 706, the data capturing controller may generate requests for controlling the data capturing devices based on the received triggers. The controller may utilize the recording control block 528 to generate the requests. The requests may be sent or transmitted to some or all of the data capturing devices via the network interface 511.

Figure 8:
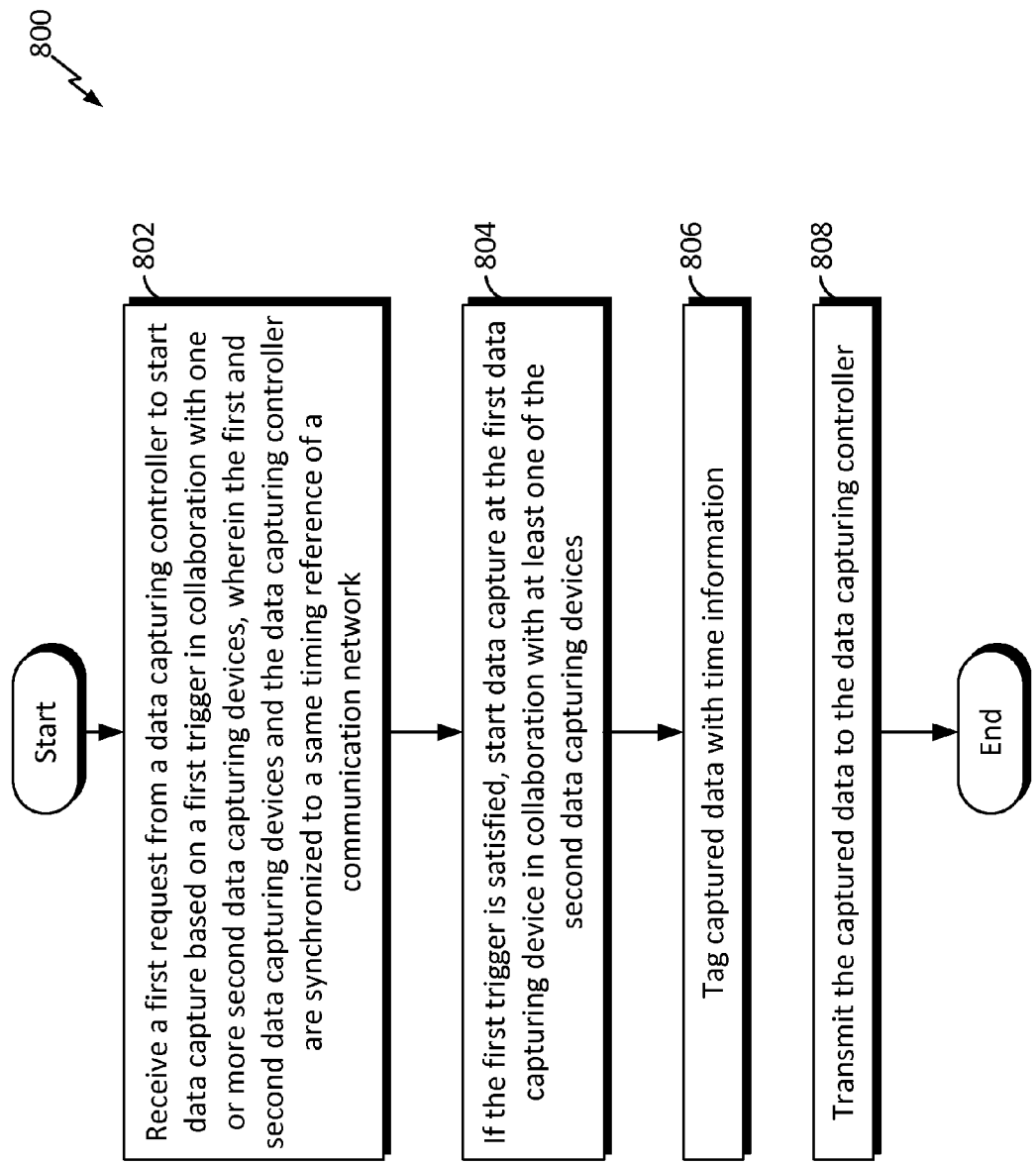
FIG. 8 is a flowchart illustrating a method of operating a data capturing device to collaboratively capture data with other time-synchronized data capturing devices in accordance with aspects of the present disclosure.

FIG. 8 is a flowchart illustrating a method 800 of operating a data capturing device to collaboratively capture data with other time-synchronized data capturing devices in accordance with aspects of the present disclosure. In one example, the method 800 may be performed using the data capturing device 400 of FIG. 4 or any suitable apparatus. At block 802, a first data capturing device may utilize a capturing control block 426 to receive a first request 428 from a data capturing controller to start data capture based on a first trigger in collaboration with one or more second data capturing devices. For example, the first and second data capturing devices may be the data capturing devices 400 of FIG. 4, and the data capturing controller may be the data capturing controller 500 of FIG. 5. The first and second data capturing devices and the data capturing controller are synchronized to a same timing reference of a communication network. For example, the timing reference may be a cellular reference time (e.g., PRC 204 of FIG. 2). In some examples, the data capturing devices may be distributed in different areas, for example, different cells of a cellular network.

At block 804, if the first trigger is satisfied, the data capturing device may utilize a capturing control block 426 to start data capture in collaboration with at least one of the second data capturing devices. The triggers may be the same as those triggers described above in reference to FIG. 3. At block 806, the data capturing device may utilize a time code block 424 to tag the captured data with time information. For example, the captured data may be tagged with one or more SMPTE codes. At block 808, the data capturing device transmits the captured data to the data capturing controller via a network interface 411. In some examples, the data capturing device (e.g., a capturing control block 426) may receive a second request from the data capturing controller to stop data capture based on a second trigger. If the second trigger is satisfied, the data capturing device stops data capture. In other examples, the data capturing device may stop data capture when the condition of the first request is no longer met. In some examples, the first request may include the stopping condition.

Figure 9:
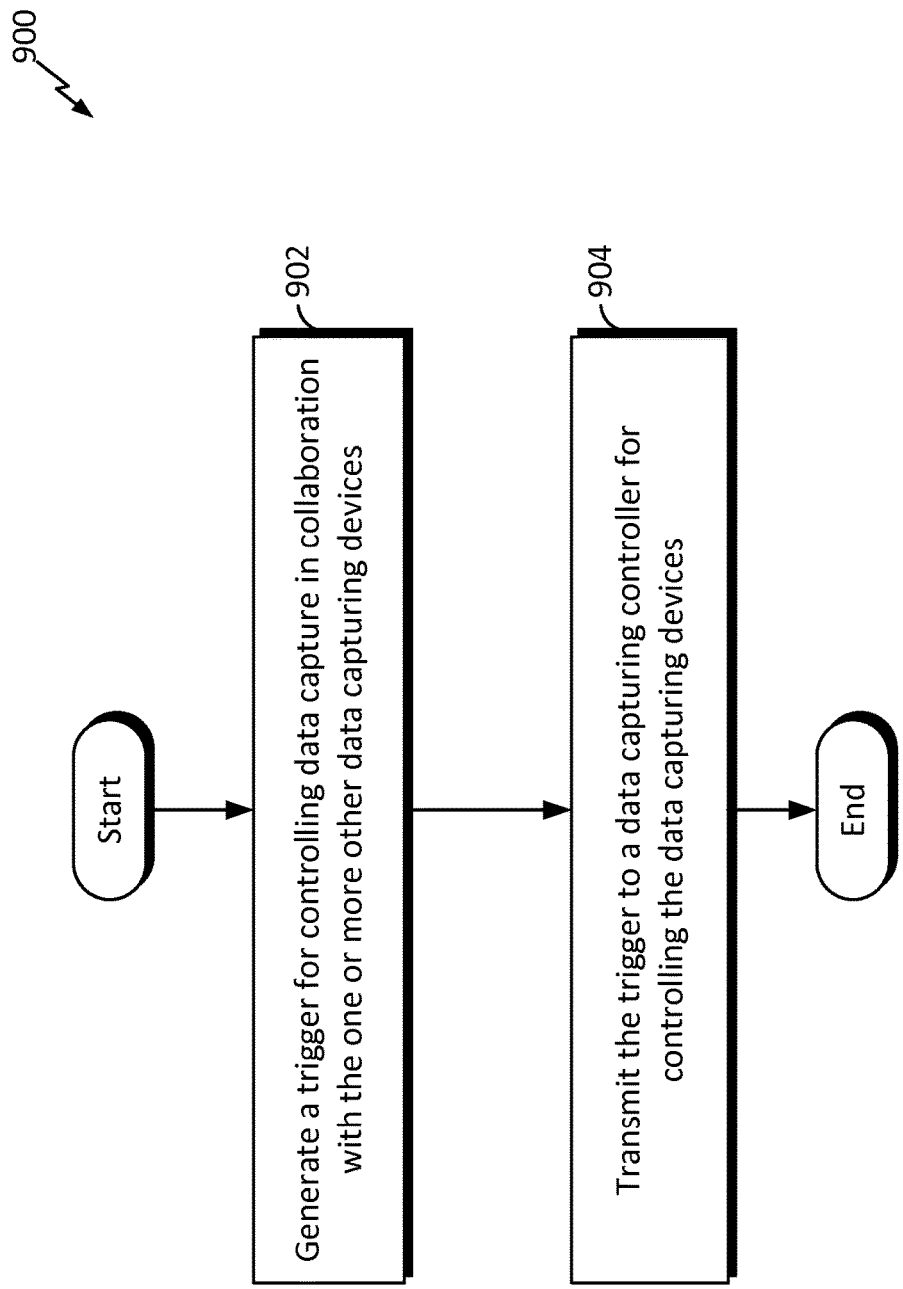
FIG. 9 is a flowchart illustrating a method of generating triggers at a data capturing device for controlling collaborative data capturing with other time-synchronized data capturing devices in accordance with an aspect of the present disclosure.

FIG. 9 is a flowchart illustrating a trigger generating method 900 operable at a data capturing device for controlling collaborative data capturing with other time-synchronized data capturing devices in accordance with an aspect of the present disclosure. In one example, the method 900 may be performed using the data capturing device 400 of FIG. 4 or any suitable devices. At block 902, a first data capturing device generates a trigger for controlling data capture in collaboration with one or more other (second) data capturing devices. A first data capturing device 400 may utilize a trigger generation block 440 to generate the trigger. For example, the trigger may be the same as those triggers described above in reference to FIG. 3. At block 904, the first data capturing device transmits the trigger to a data capturing controller for controlling the other data capturing devices. In response, the data capturing controller may send a corresponding capturing request to other data capturing device(s).

The methods illustrated in FIGS. 6-9 may be performed concurrently or separately in any suitable orders at one or more data capturing devices and/or data capturing controller, and are not limited in any particular order or time constraint.

Figure 10:
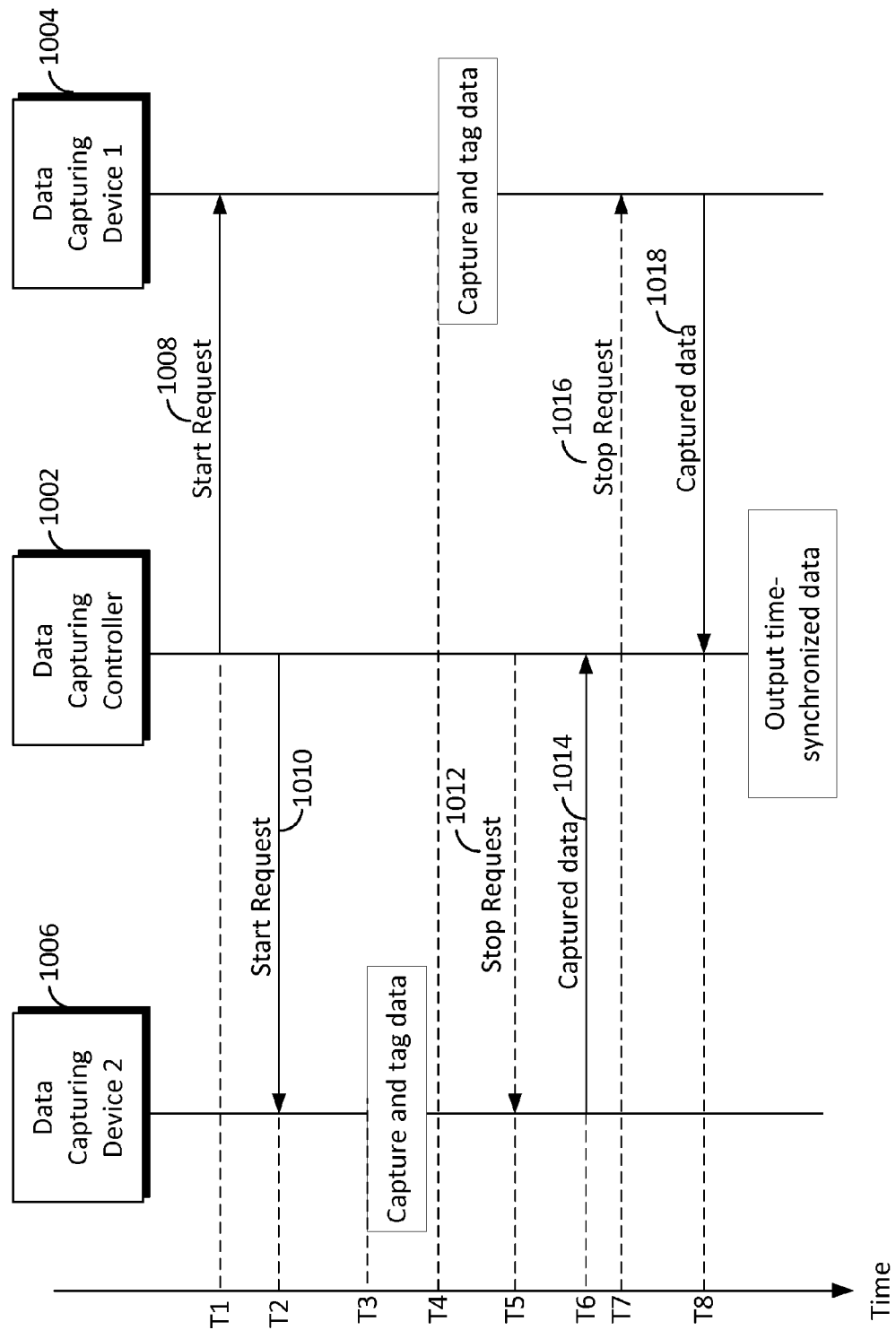
FIG. 10 is an event flow diagram illustrating an example of collaborative data capturing utilizing a data capturing controller and two data capturing devices in accordance with an aspect of the disclosure.

FIG. 10 is an event flow diagram illustrating an example of collaborative data capturing utilizing a data capturing controller and two data capturing devices in accordance with an aspect of the disclosure. The data capturing controller 1002 may be the same as the data capturing controller 500 of FIG. 5, and the data capturing devices 1004, 1006 may be the same as the data capturing device 400 of FIG. 4. At a time T1, the data capturing controller 1002 sends a start request 1008 to the first data capturing device 1004 based on a first trigger. At a time T2, the data capturing controller 1002 sends a start request 1010 to the second data capturing device 1006 based on a second trigger. In some examples, the first and second time T1 and T2 may be different or the same. In some examples, the first and second triggers may be different or the same. The triggers may be any of the time or event based triggers described above in reference to FIG. 3. At a time T3, the second trigger is satisfied, and the second data capturing device 1006 starts capturing data and tags the captured data with one or more time codes. For example, the time code may be SMPTE code. At a time T4, the first trigger is satisfied, and the first data capturing device 1004 starts capturing data and tags the captured data with one or more time codes. In some examples, the first and second data capturing devices, together with the data capturing controller, are synchronized to the same time reference of a cellular network. The data capturing devices 1004 and 1006 may be cameras, for example.

At a time T5, the data capturing controller 1002 may send a stop request 1012 to the second data capturing device 1006 base on a certain trigger. In response to the stop request 1012, the second data capturing device 1006 stops capturing data when the trigger is satisfied. In some examples, the data capturing controller 1002 may not send the stop request 1012, and the second data capturing device 1006 can stop capturing data based on the trigger of the second start request 1010. For example, when the trigger of the second start request 1010 is no longer valid or satisfied, the second data capturing device 1006 stops capturing data. In some examples, the second start request 1010 may provide the condition when data capturing should be stopped. Non-limiting examples of the stopping condition may be a capturing time length and an amount of captured data.

At a time T6, the second data capturing device 1006 sends the captured data 1014 tagged with one or more time codes to the data capturing controller 1002. At a time T7, the data capturing controller 1002 may send a stop request 1016 to the first data capturing device 1004. In response to the stop request 1016, the first data capturing device 1004 stops capturing data when the trigger is satisfied. In some examples, the data capturing controller 1002 may not send the stop request 1016, and the first data capturing device 1004 can stop capturing data based on the trigger of the first start request 1008. For example, when the trigger of the first start request 1008 is no longer valid or satisfied, the first data capturing device 1004 should stop capturing data. In some examples, the first start request 1008 may provide the condition when data capturing should stop. Non-limiting examples of the stopping condition may be a capturing time length and an amount of captured data.

At a time T8, the first data capturing device 1004 sends the captured data 1018 tagged with one or more time codes to the data capturing controller 1002. Based on the time codes of the captured data 1014, 1018, the data capturing controller 1002 can output time-synchronized data including all or portions of the captured data 1014 and 1018 that are collaboratively captured by the first and second data capturing devices.

As those skilled in the art will readily appreciate, various aspects described throughout this disclosure may be extended to any telecommunication systems, network architectures and communication standards. By way of example, various aspects may be extended to UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of operating a data capturing controller for collaborative data capturing, comprising:
    communicating with a plurality of data capturing devices, wherein the data capturing controller and the plurality of data capturing devices are synchronized to a same timing reference of a communication network;
    managing a plurality of time and event based triggers for controlling data capturing utilizing the plurality of data capturing devices including a first device and a second device;

controlling different groups of the plurality of data capturing devices utilizing different trigger types of the plurality of time and event based triggers, comprising:
at a first time point, transmitting a first request to the first device to start data capturing in collaboration with the second device, based on a first trigger type of the plurality of time and event based triggers; and
at a second time point different from the first time point, transmitting a second request to the second device to start data capturing based on a second trigger type of the plurality of time and event based triggers while maintaining data capturing at the first device;
receiving and aggregating respective time-coded data from the plurality of data capturing devices; and
providing, synchronized in time, the aggregated time-coded data as a real-time audio or video stream.

2. The method of claim 1, further comprising receiving one or more of the plurality of time and event based triggers from the plurality of data capturing devices.

3. The method of claim 1, further comprising:
receiving a user input; and
generating one or more of the plurality of time and event based triggers in response to the user input.

4. The method of claim 1, further comprising:
transmitting a third request to the first device to stop capturing data while maintaining data capturing at the second device.

5. The method of claim 1, wherein the plurality of time and event based triggers comprise at least one of:
a location based trigger configured to start or stop data capturing;
a motion based trigger configured to start or stop data capturing;
a speed based trigger configured to start or stop data capturing;
a force based trigger configured to start or stop data capturing;
a sound based trigger configured to start or stop data capturing; or
a scene based trigger configured to start or stop data capturing.

6. The method of claim 1, wherein the timing reference comprises a primary reference clock of a cellular network.

7. A method of operating a first data capturing device for collaborative data capturing, comprising:
receiving a first request from a data capturing controller to start data capture based on a first trigger in collaboration with one or more second data capturing devices, wherein the first and second data capturing devices and the data capturing controller are synchronized to a same timing reference of a communication network;
if the first trigger is satisfied, starting data capture in collaboration with at least one of the second data capturing devices;
tagging captured data with time information;
transmitting the captured data to the data capturing controller;
generating a second trigger at the first data capturing device for starting or stopping data capture in collaboration with the one or more second data capturing devices that are synchronized to the same timing reference with the first data capturing device, the first trigger and the second trigger being different types of a plurality of time and event based triggers; and
transmitting the second trigger to the data capturing controller.

8. The method of claim 7, further comprising:
receiving a second request from the data capturing controller to stop data capture based on the second trigger; and
if the second trigger is satisfied, stopping data capture.

9. The method of claim 7, wherein the plurality of time and event based triggers comprises at least one of:
a location based trigger configured to start or stop data capturing;
a motion based trigger configured to start or stop data capturing;
a speed based trigger configured to start or stop data capturing;
a force based trigger configured to start or stop data capturing;
a sound based trigger configured to start or stop data capturing; or
a scene based trigger configured to start or stop data capturing.

10. The method of claim 7, wherein the timing reference comprises a primary reference clock of a cellular network.

11. The method of claim 7, wherein the tagging captured data comprising tagging the captured data with one or more Society of Motion Picture and Television Engineers (SMPTE) codes.

12. A data capturing controller for collaborative data capturing, comprising:
a network interface configured to communicate with a plurality of data capturing devices, wherein the data capturing controller and the plurality of data capturing devices are synchronized to a same timing reference of a communication network;
a recording control block configured to manage a plurality of time and event based triggers for controlling data capturing utilizing the plurality of data capturing devices including a first device and a second device; and
a capturing manager block, utilizing the network interface, configured to:
control different groups of the plurality of data capturing devices utilizing different trigger types of the plurality of time and event based triggers, comprising:
at a first time point, transmitting a first request to the first device to start data capturing in collaboration with the second device, based on a first trigger type of the plurality of time and event based triggers; and
at a second time point different from the first time point, transmitting a second request to the second device to start data capturing based on a second trigger type of the plurality of time and event based triggers while maintaining data capturing at the first device;
receive and aggregate respective time-coded data from the data capturing devices; and
provide, synchronized in time, the aggregated time-coded data as a real-time audio or video stream.

13. The data capturing controller of claim 12, wherein the recording control block is further configured to receive one or more of the plurality of time and event based triggers from the plurality of data capturing devices.

14. The data capturing controller of claim 12, further comprising:
a user interface configured to receive a user input,
wherein the recording control block is further configured to generate one or more of the plurality of time and event based triggers in response to the user input.

15. The data capturing controller of claim 12, wherein the capturing manager block is further configured to:
transmit a third request to the first device to stop capturing data while maintaining data capturing at the second device.

16. The data capturing controller of claim 12, wherein the plurality of time and event based triggers comprise at least one of:
a location based trigger configured to start or stop data capturing;
a motion based trigger configured to start or stop data capturing;
a speed based trigger configured to start or stop data capturing;
a force based trigger configured to start or stop data capturing;
a sound based trigger configured to start or stop data capturing; or
a scene based trigger configured to start or stop data capturing.

17. The data capturing controller of claim 12, wherein the timing reference comprises a primary reference clock of a cellular network.

18. A first data capturing device for collaborative data capturing, comprising:
a network interface configured to communicate with a data capturing controller and one or more second data capturing devices;
a capturing control block configured to:
receive a first request from the data capturing controller to start data capture based on a first trigger in collaboration with the one or more second data capturing devices, wherein the first and second data capturing devices and the data capturing controller are synchronized to a same timing reference of a communication network;
if the first trigger is satisfied, start data capture in collaboration with at least one of the second data capturing devices; and
transmit the captured data to the data capturing controller;
a time code block configured to tag the captured data with time information; and
a trigger generation block configured to:
generate a second trigger at the first data capturing device for starting or stopping data capture in collaboration with the one or more second data capturing devices that are synchronized to the same timing reference with the first data capturing device, the first trigger and the second trigger being different types of a plurality of time and event based triggers; and
transmit the second trigger to the data capturing controller.

19. The data capturing device of claim 18, wherein the capturing control block is further configured to:
receive a second request from the data capturing controller to stop data capture based on the second trigger; and
if the second trigger is satisfied, stop data capture.

20. The data capturing device of claim 18, wherein the plurality of time and event based triggers comprises at least one of:
a location based trigger configured to start or stop data capturing;
a motion based trigger configured to start or stop data capturing;
a speed based trigger configured to start or stop data capturing;
a force based trigger configured to start or stop data capturing;
a sound based trigger configured to start or stop data capturing; or
a scene based trigger configured to start or stop data capturing.

21. The data capturing device of claim 18, wherein the timing reference comprises a primary reference clock of a cellular network.

22. The data capturing device of claim 18, wherein the time code block is further configured to tag the captured data with one or more Society of Motion Picture and Television Engineers (SMPTE) codes.

* * * * *